F. H. FIELD.
SHOCK ABSORBER.
APPLICATION FILED JULY 1, 1920.
1,378,532.
Patented May 17, 1921.
2 SHEETS—SHEET 1.
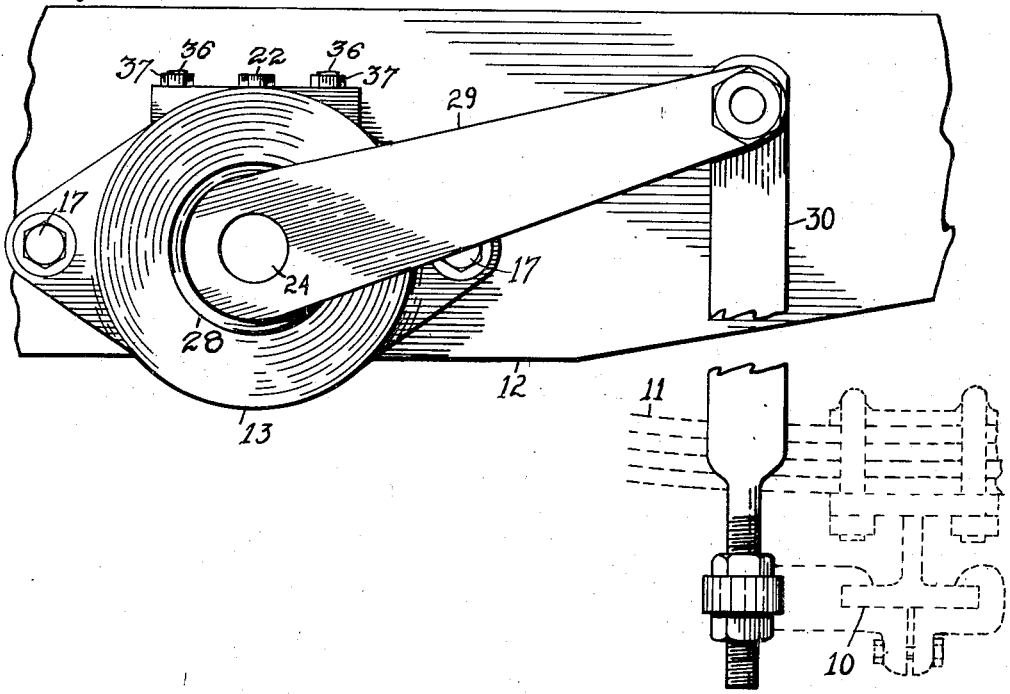
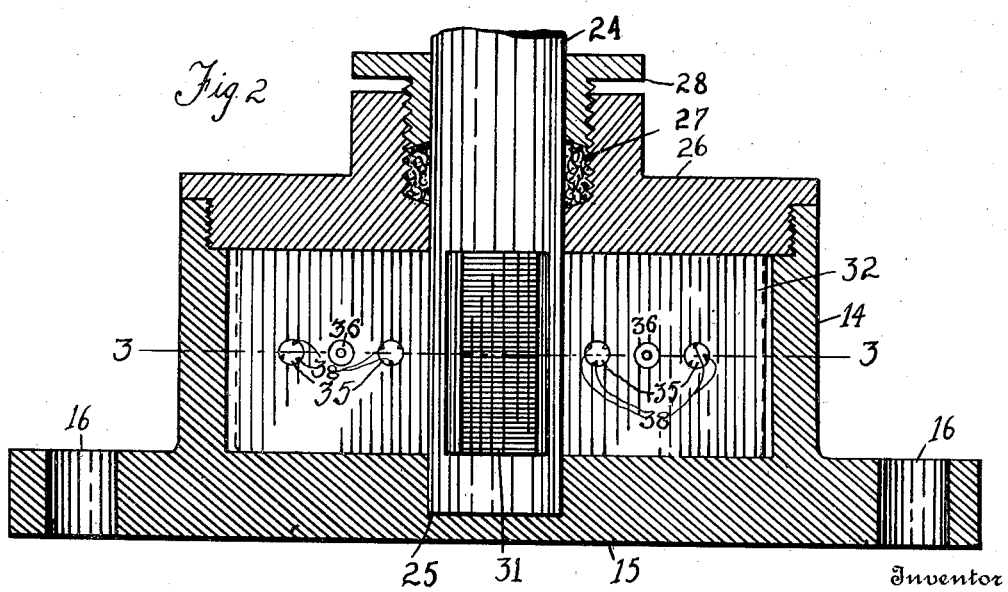
Inventor
Frank H. Field
By S. Arthur Baldwin
Attorney

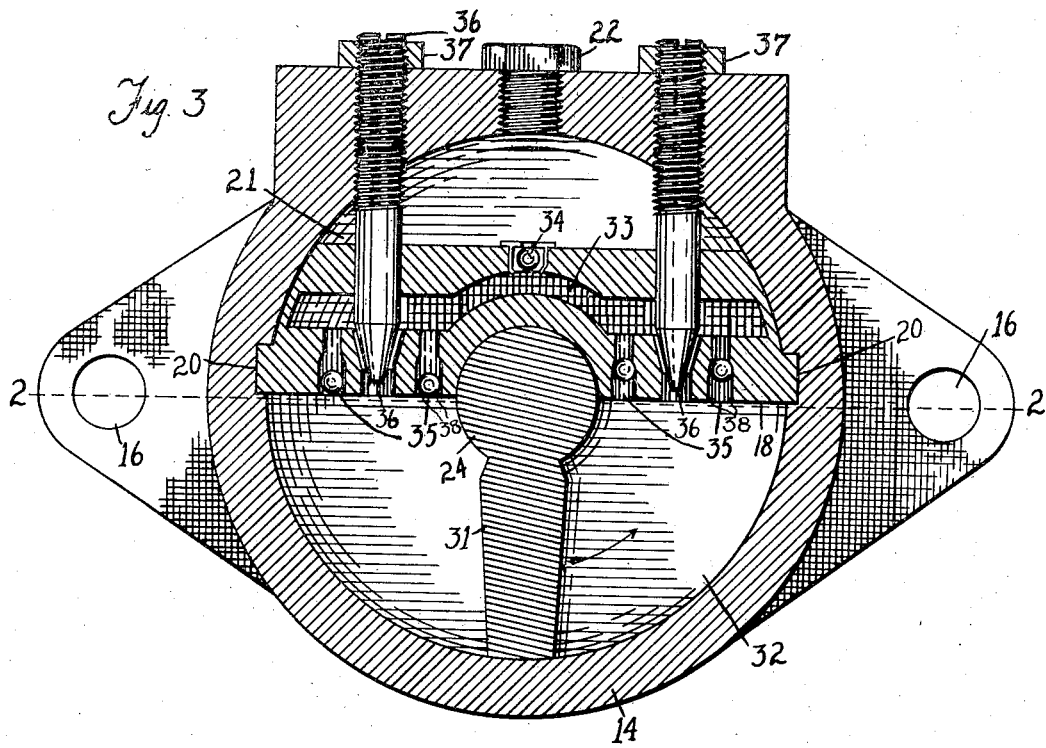
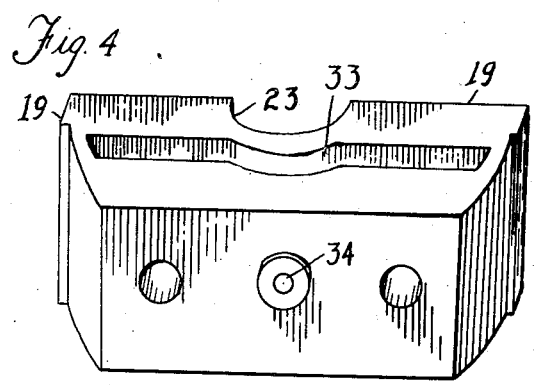

UNITED STATES PATENT OFFICE.

FRANK H. FIELD, OF JAMESTOWN, NEW YORK.

SHOCK-ABSORBER.

1,378,532.     Specification of Letters Patent.     Patented May 17, 1921.

Application filed July 1, 1920. Serial No. 393,451.

*To all whom it may concern:*

Be it known that I, FRANK H. FIELD, a citizen of the United States, residing at the city of Jamestown, in the county of Chautauqua and State of New York, have invented certain new and useful Improvements in Shock-Absorbers, of which the following, taken in connection with the accompanying drawings, is a specification.

The invention relates to hydraulic shock absorbers for vehicles, self-propelled or otherwise; and the object of the improvement is to provide a simple rotary hydraulic shock absorber in which the piston chamber is constantly supplied with liquid, preferably oil, the construction being provided with valvular control for said liquid so as to permit the slow outward flow of the same thereby retarding the movement of the piston, whereby shocks and the consequent quick action of the vehicle springs are overcome, thereby reducing the shocks arising from rough and uneven roads; and the invention consists in the novel features and combinations hereinafter set forth and claimed.

In the drawings, Figure 1 is an elevation of the shock absorber attached to a portion of the chassis or frame of the car and the axle, a portion of the spring and axle being shown in dotted outline. Fig. 2 is a diametral crosswise sectional view of the shock absorber on the line 2—2 in Fig. 3, with the exception of the shaft and blade piston. Fig. 3 is a sectional view of the shock absorber at line 3—3 in Fig. 2 showing the construction and arrangement of the same. Fig. 4 is a perspective view of the diametral partition block removed from the shock absorber cylinder, showing the shape and construction of the same.

Like characters of reference refer to corresponding parts in the several views.

The numeral 10 designates the vehicle axle, and the numeral 11 a portion of the vehicle spring attached to said axle. The numeral 12 designates a portion of the chassis or frame of the vehicle.

The shock absorber 13 consists of the cylindrical casing 14 which is preferably cast with a base plate 15 which extends out beyond said cylindrical casing 14 at each side and has the holes 16 therein for attaching to the side of the chassis or frame 12 by means of the bolts 17. The cylindrical portion 14 of the casing has the diametral horizontal crosswise partition 18 which is shaped as shown in Fig. 4 as to its ends, having the projecting portions 19 which enter the channel grooves 20 on the opposite inner sides of said cylindrical portion 14, the curved upper surfaces of the remaining portion of the ends fitting against the inner walls of said cylindrical portion 14 and thereby forming an oil chamber 21 in said upper portion which has the screw bolt closed opening 22 for filling the same.

The plate 19 has the semi-circular opening 23 therein for the crosswise shaft 24 which is mounted centrally crosswise of the cylindrical portion 14, one end being journaled in the inner side of the plate 15 in the opening 25 and the other end of said shaft 24 being journaled in the closure plate 26 which screws into the cylindrical portion 14. The shaft 24 has a stuffing box 27 with gland 28 for packing the joint around said shaft 24. A lever arm 29 is attached on the outer end of said shaft 24, which arm is connected to the axle 10 by a link 30 so that as said axle 11 with the spring thereon moves upward and downward, the motion is immediately communicated to the shaft 24 and thereby to the shock absorber 13.

Said shaft 24 has a blade piston 31, preferably forged integral therewith and extending out at right angles thereto and fitting within the semi-circular shaped chamber 32 formed by the crosswise partition 18 in the cylindrical body 14 so that said blade piston 31 moves reciprocally backward and forward within said chamber 32 responsive to the movements of the shaft 24 from said movements of the axle 10, being stopped in each direction by said crosswise partition 18 or the hydraulic contents of the chamber 32.

The plate 18 contains the crosswise passage 33 which is connected to the chamber 21 by the valve, preferably a ball valve, 34 on the upper side, each end of the passage 33 being connected to the chamber 32 by means of ball valves 35 at each side of the shaft 24 and by the needle valve 36 each side of said shaft 24, which needle valve 36 is threaded on its upper end and slotted having a lock nut 37 so as to externally adjust said needle valve as to its valve seat within the plate 18. The ball valves 35 have the preferably struck-up points 38 at their lower ends to hold the balls.

It is now apparent that the liquid, preferably heavy oil, may be entered into the interior of the cylindrical part 14 through the filling opening 22 and that the semicircular chamber 32 will be filled with said heavy oil as well as the passageway 33 and chamber 21. The oil can flow down through the ball valve 34 from the chamber 21, but cannot flow back on account of the pressure of the oil from below closing said valve 34. The blade piston 31 reciprocally moving backward and forward in the semi-circular chamber 32 presses the oil or other liquid against one side or the other. It is shown in Fig. 3 as turning toward the right. The ball valves 35 are both closed on the right side, thereby forcing the heavy oil through the opening formed by the slightly open needle valve 36 impeding the action of said blade 31 and retarding or softening the movement of the vehicle body which is the end sought to be attained.

The packing 27 around the shaft 24 prevents the oil or other liquid under heavy pressure being forced out of the chamber 32, hence it must pass through the passage 33 and down through the valvular openings 35 and 36 on the opposite side, filling the opposite portion of the chamber 32.

It is apparent that this simple arrangement of the blade piston 31 within its semi-cylindrical chamber attains the purpose of softening or absorbing the shock and thereby overcomes the rough jolting from excrescences of the roadway.

I claim as new:

1. A shock absorber connected to the running gear of a vehicle comprising a casing having a semi-circular chamber therein, a blade piston rotatably mounted in said chamber to be actuated by said running gear, a liquid reservoir above said chamber having passages to each end of said semicircular chamber, and a plurality of valves in said passages to each end of said chamber to adjustably control the action of said blade piston.

2. A shock absorber comprising a cylindrical casing, a horizontal partition diametrally crosswise of said cylindrical casing to form liquid and piston chambers therein, a shaft rotatably mounted central of said cylinder and a blade piston thereon fitting within said piston chamber reciprocally actuated by the movement of said axle, said shaft having actuating connection to the axle of a vehicle, ball valves in said partition each side of said shaft, and needle valves one each side of said shaft exteriorly adjustable as to their valve seats in said partition.

3. A shock absorber having actuating connection to the axle of a vehicle comprising a cylindrical casing, a screw filled inlet to the interior of said casing, a diametral partition slidably mounted within grooves in the interior walls of said cylindrical casing to provide a semi-circular piston chamber and a liquid chamber above said piston chamber, said partition having passages for liquid therethrough connecting said chamber, a ball valve in said passage from said liquid chamber formed by said partition into the main passageway for said liquid, ball valves each side of the center of said partition from said passages to said piston chamber to permit the free flow of the liquid when not closed by the pressure of the piston blade, needle valves one each side of the center exteriorly adjustable upon their valve seats in said partition, and a shaft rotatably mounted central of said cylinder having a blade piston thereon fitting within the semi-circular chamber in the lower portion of said cylinder casing.

In testimony whereof I have affixed my signature in the presence of two witnesses.

FRANK H. FIELD.

Witnesses:
C. V. SWANSON,
THEO. HAAG.